US011685683B2

(12) United States Patent
Liu et al.

(10) Patent No.: US 11,685,683 B2
(45) Date of Patent: Jun. 27, 2023

(54) HIGH-STRENGTH GEOPOLYMER HOLLOW MICROSPHERE, PREPARATION METHOD THEREOF AND PHASE CHANGE ENERGY STORAGE MICROSPHERE

(71) Applicant: CHINA UNIVERSITY OF PETROLEUM (EAST CHINA), Qingdao (CN)

(72) Inventors: Huajie Liu, Qingdao (CN); Yuhuan Bu, Qingdao (CN); Rui Ma, Qingdao (CN); Shenglai Guo, Qingdao (CN); Longlong An, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 922 days.

(21) Appl. No.: 16/485,450

(22) PCT Filed: May 25, 2018

(86) PCT No.: PCT/CN2018/088411
§ 371 (c)(1),
(2) Date: Aug. 13, 2019

(87) PCT Pub. No.: WO2018/233449
PCT Pub. Date: Dec. 27, 2018

(65) Prior Publication Data
US 2020/0002210 A1 Jan. 2, 2020

(30) Foreign Application Priority Data

Jun. 21, 2017 (CN) .......................... 201710473085.9
Oct. 13, 2017 (CN) .......................... 201710952207.2

(51) Int. Cl.
*C03B 19/10* (2006.01)
*C03C 11/00* (2006.01)
(Continued)

(52) U.S. Cl.
CPC ........ *C03B 19/1075* (2013.01); *C03C 11/005* (2013.01); *C04B 12/005* (2013.01);
(Continued)

(58) Field of Classification Search
CPC .......................... C03B 19/107; C03B 19/1075
See application file for complete search history.

(56) References Cited

U.S. PATENT DOCUMENTS 4,637,990 A * 1/1987 Torobin ................. B29C 49/46
502/8
5,176,732 A * 1/1993 Block ................ C03B 19/1065
501/59
(Continued)

FOREIGN PATENT DOCUMENTS

CN 101555401 A 10/2009
CN 101905153 A 12/2010
(Continued)

*Primary Examiner* — Cynthia Szewczyk
(74) *Attorney, Agent, or Firm* — Bayramoglu Law Offices LLC

(57) ABSTRACT

A high-strength geopolymer hollow microsphere, a preparation method thereof and a phase change energy storage microsphere are provided, including: dissolving sodium hydroxide, sodium silicate and spheroidizing aid in water to form a solution A, and adding active powder to the solution A, stirring and uniformly mixing to form a slurry B, adding the slurry B to an oil phase, stirring and dispersing into balls, filtering to obtain geopolymer microspheres I, washing the geopolymer microspheres I, and then carrying out a high-temperature calcination to obtain the high-strength geopolymer hollow microspheres II; using the high-strength geopolymer hollow microsphere as a carrier, absorbing a phase change material into the carrier, and mixing a microsphere carrying the phase change material with an epoxy resin, adding a powder dispersant and stirring to disperse the microsphere, after the epoxy resin is solidified, screening the
(Continued)

superfluous powder dispersant to obtain the phase energy storage microsphere.

9 Claims, 2 Drawing Sheets

(51) Int. Cl.
*C04B 12/00* (2006.01)
*C04B 103/00* (2006.01)
*C04B 20/10* (2006.01)
*C04B 14/04* (2006.01)

(52) U.S. Cl.
CPC .......... *C03B 19/107* (2013.01); *C04B 14/044* (2013.01); *C04B 20/1037* (2013.01); *C04B 2103/0071* (2013.01); *Y02P 40/10* (2015.11)

(56) References Cited

U.S. PATENT DOCUMENTS

| | | | |
|---|---|---|---|
| 2004/0080063 A1* | 4/2004 | Datta | ................... C04B 18/027 424/490 |
| 2004/0262801 A1* | 12/2004 | Hojaji | ................... C04B 28/02 264/610 |

FOREIGN PATENT DOCUMENTS

| | | | | |
|---|---|---|---|---|
| CN | 103803952 A | | | 5/2014 |
| CN | 104496544 A | | | 4/2015 |
| CN | 104559981 A | | | 4/2015 |
| CN | 105289469 A | * | | 2/2016 |
| CN | 105289469 A | | | 2/2016 |
| CN | 105733519 A | | | 7/2016 |
| CN | 106215854 A | | | 12/2016 |
| CN | 107162565 A | | | 9/2017 |
| CN | 107500591 A | | | 12/2017 |

* cited by examiner

HIGH-STRENGTH GEOPOLYMER HOLLOW MICROSPHERE, PREPARATION METHOD THEREOF AND PHASE CHANGE ENERGY STORAGE MICROSPHERE

CROSS REFERENCE TO THE RELATED APPLICATIONS

This application is the national phase entry of International Application No. PCT/CN2018/088411, filed on May 25, 2018, which is based upon and claims priority to Chinese Patent Application No. 201710473085.9, filed on Jun. 21, 2017, and Chinese Patent Application No. 201710952207.2, fled on Oct. 13, 2017, the entire contents of which are incorporated herein by reference.

TECHNICAL FIELD

The present invention belongs to the technical field of microsphere materials, and particularly relates to a high-strength geopolymer hollow microsphere, a preparation method thereof and a phase change energy storage microsphere.

BACKGROUND

Hollow microspheres are hollow micro spherical materials, which are hollow particles having unique and stable properties. Because of their special morphology and hollowness, hollow microspheres are widely used in fields of oil well cementing, building, packaging materials, wave-absorbing materials, light-weight high-strength concrete admixtures and others.

At present, hollow microspheres mainly include hollow glass microspheres, hollow ceramic microspheres, ZnO-doped $TiO_2$ composite hollow spheres (CN101905153A) and light-weight aluminum-zirconium hollow microspheres (CN 103803952 A). For now, except for the hollow glass microspheres having a relatively mature production process, production processes of other hollow microspheres are relatively complex, and impurities get easily introduced in the production processes of microspheres. In addition, although the production process of the hollow glass microspheres is mature, a compressive strength of the hollow glass microspheres is low.

Due to a low-temperature and high-pressure environment of the seabed, there is a large amount of natural gas hydrate in a shallow layer of deep ocean water. Hydrate gets easily decomposed when heated, and is prone to cause well cementing accidents, bringing a severe challenge for deep-water cementing, and even may cause serious disastrous accidents such as submarine landslides. Therefore, cement is required to have a low hydration heat property when performing a well cementing on a hydrate layer, while a cement system for the well cementing used currently does not have the low hydration heat property.

Adding phase change materials to a cement slurry is a commonly used method for effectively reducing the hydration heat of the cement. When the cement is hydrated, phase changes of the phase change materials occur to absorb heat, and the heat is stored, thereby reducing the hydration heat of the cement. Since the commonly used phase change materials are usually oil phase, adding oil phase directly into the cement slurry will lead to delamination, affecting the heat absorption effect, and affecting the strength and sealing performance of cement stone. Therefore, before using in the cement slurry, the phase change materials are required to be loaded through a special method. For example, as proposed in CN104559981A, C14 paraffin, polyethylene glycol 400, iron bromide hexahydrate and zeolite powder are mixed to form a phase change energy storage material according to a mass ratio of 3:1:1:4, wherein the zeolite is a porous material and is used as a carrier. However, the energy storage material affects the final strength performance of the cement stone. CN105733519A proposed a suspension polymerization method for sealing phase change materials in methyl methacrylate microspheres, and using a special dispersant to develop hydrophilic phase change microcapsules. Adding such microcapsules to the cement slurry can significantly reduce the hydration heat of the cement, and has little effect on the strength performance of the cement stone. However, the preparation process of the phase change microcapsules is complex, and the performance requirements of the materials for preparation are high. The use of different batches of materials may result in failure of microcapsule preparation, which is difficult to industrialize.

SUMMARY

In order to overcome the deficiencies of the prior art described above, the objective of the present invention is to provide a high-strength geopolymer hollow microsphere, a preparation method thereof and a phase change energy storage microsphere.

In order to achieve the above objective, the technical solution of the present invention is as follows.

A method of preparing high-strength geopolymer hollow microspheres is as follows: dissolving sodium hydroxide (NaOH), sodium silicate ($Na_2SiO_3 \cdot 9H_2O$) and spheroidizing aid in water to form a solution A, adding active powder to the solution A, stirring and uniformly mixing to form a slurry B, adding the slurry B to an oil phase, stirring and dispersing into balls, after stirring, filtering to obtain geopolymer microspheres I, washing the geopolymer microspheres I, and then carrying out a high-temperature calcination to obtain the high-strength geopolymer hollow microspheres II; wherein, a mass percentage of the sodium hydroxide (NaOH), the sodium silicate ($Na_2SiO_3 \cdot 9H_2O$) and the spheroidizing aid is (10-40%):(20-60%):(20-60%), a mass ratio of the water to the active powder is 1:2-1, the slurry B accounts for 5%-50% of a volume of the oil phase dispersion medium, a temperature of the high-temperature calcination is 800-1500° C., a time of the high-temperature calcination is 1-8 hours.

Preferably, the mass percentage of the sodium hydroxide (NaOH), the sodium silicate ($Na_2SiO_3 \cdot 9H_2O$) and the spheroidizing aid is (12-20%):(40-60%):(30-50%), the mass ratio of the water to the active powder is 1:1.5-1, the slurry B accounts for 10%-40% of the volume of the oil phase dispersion medium.

Preferably, the temperature of the high-temperature calcination is 850-1200° C., the time of the high-temperature calcination is 1-2 hours.

Preferably, a ratio of mass parts of the sodium hydroxide (NaOH), the sodium silicate ($Na_2SiO_3 \cdot 9H_2O$), the spheroidizing aid and the water is (12-20):(40-60):(30-50):100.

Preferably, the spheroidizing aid is a sodium salt and a potassium salt.

Preferably, the sodium salt includes one or more selected from the group consisting of sodium carbonate, sodium chloride, sodium nitrate, and sodium sulfate.

Preferably, the potassium salt includes one or more selected from the group consisting of potassium chloride, potassium carbonate, and potassium sulfate.

Preferably, the active powder includes one or more selected from the group consisting of fly ash, metakaolin and slag.

Preferably, the active powder has a mesh number of 500 to 1000 mesh.

Preferably, the oil phase is a corn oil, a soybean oil, a peanut oil, a kerosene, a castor oil, or a rapeseed oil.

Preferably, a temperature of the oil phase is 50-90° C.

Preferably, a stirring speed of dispersing the slurry B into the oil phase is 400-1000 r/min, and a stirring time is 0.5-3 hours.

Preferably, the temperature of the high-temperature calcination is 800-1500° C., the time of the high-temperature calcination is 1-8 hours.

Preferably, the geopolymer hollow microspheres obtained by the preparation method of the present invention have a particle size ranging from 50 to 300 μm, a wall thickness of 10 to 50 μm, a density of 0.5 to 0.8 g/cm$^3$, and a compressive strength of equal to or higher than 20 MPa.

The present invention also provides a high-strength geopolymer hollow microsphere prepared by the above-mentioned method of preparing the high-strength geopolymer hollow microsphere.

The present invention also provides a phase change energy storage microsphere prepared by using the above-mentioned high-strength geopolymer hollow microsphere as a carrier.

The present invention also provides a method of preparing the above-mentioned phase change energy storage microsphere, using the high-strength geopolymer hollow microsphere as the carrier, absorbing the phase change material into a hollow of the carrier microsphere by a vacuum suction, mixing the microsphere carrying the phase change material with epoxy resin to make the epoxy resin coating on a surface of the microsphere, adding a powder dispersant and stirring to disperse the microsphere, after the epoxy resin is solidified, screening a superfluous powder dispersant to obtain the phase energy storage microsphere.

Preferably, the phase change material is paraffin wax having a carbon number of 18-30.

Preferably, an addition amount of the phase change material is 10%-20% of a mass of the geopolymer hollow microsphere, and an addition amount of the epoxy resin is 5%-15% of the mass of the geopolymer hollow microsphere.

Further, the addition amount of the phase change material is 10%-18% of the mass of the geopolymer hollow microsphere, and the addition amount of the epoxy resin is 8%-15% of the mass of the geopolymer hollow microsphere.

Preferably, the epoxy resin is an ambient cured waterborne or oily epoxy resin.

Preferably, a component of the powder dispersant is one or more selected from the group consisting of ultrafine calcium carbonate, silicon powder, metakaolin, graphite powder and ultrafine slag.

Preferably, the powder dispersant has a particle size of 1000-2000 mesh.

Further, the powder dispersant has the particle size of 1200-1500 mesh.

Preferably, a stirring speed of dispersing the microsphere in the powder dispersant is 100-500 r/min, and a stirring time is 0.5-2 hours.

Further, the stirring speed of dispersing the microsphere in the powder dispersant is 100-300 r/min, and the stirring time is 0.5-1.5 hours.

A specific method of the vacuum suction is as follows: placing the geopolymer hollow microsphere and the phase change material in a molten state in an open container, and placing the open container in a vacuum chamber, wherein a temperature in the vacuum chamber is higher than a melting point of the phase change material; under a pressure of −0.1 MPa, vacuuming for 30-80 min, and then moving the microsphere from the vacuum chamber to a 4° C. environment for freezing until the phase change material become solid, storing the phase change material in a core part of the hollow microsphere in a solid form to obtain a microsphere carrying the phase change material.

Advantages of the present invention:

Compared with the traditional methods of preparing hollow microspheres, the method of preparing the high-strength geopolymer hollow microsphere provided by the present invention has the advantages of simple process, low raw material cost, wide availability of sources of raw materials, high pelletizing rate, low production cost, high strength of hollow microspheres, and large-scale production.

Compared with the existing methods of preparing phase change energy storage microspheres, the method of preparing the phase change energy storage microsphere provided by the present invention has the advantages of simple process, low raw material price, wide availability of sources of raw materials, low production cost, and large-scale production. Moreover, the phase change energy storage microsphere provided by the present invention can significantly reduce the peak value of cement hydration exothermic temperature, and has little influence on the strength of cement stone.

BRIEF DESCRIPTION OF THE DRAWINGS

The above and/or additional aspects and advantages of the present invention will become apparent and readily understood in the description of the embodiments in conjunction with the following drawings.

DETAILED DESCRIPTION OF THE EMBODIMENTS

Figure 1:
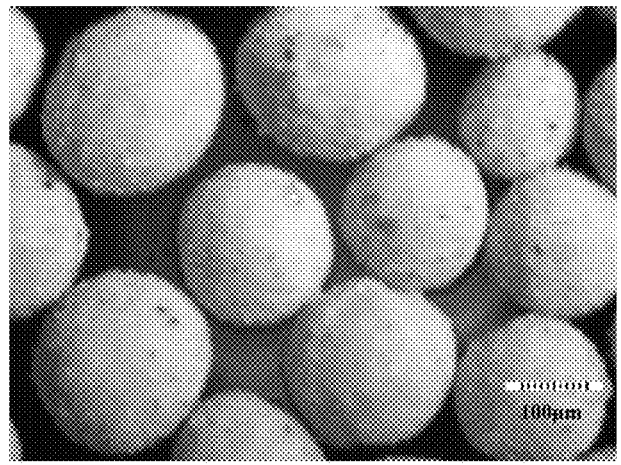
FIG. 1 is a micrograph showing a geopolymer hollow microsphere, with a particle size of 50-100 μm.

The present invention will be further described in conjunction with the drawings and embodiments. It should be noted that the following description is only for the purpose of explaining the present invention and is not intended to limit the content thereof.

Embodiment 1

High-Strength Geopolymer Hollow Microspheres, and a Preparation Method thereof 1.5 g of sodium hydroxide (NaOH), 5 g of sodium silicate ($Na_2SiO_3 \cdot 9H_2O$) and 3 g of sodium chloride (NaCl) were dissolved in 10 g of water to form a solution A, and 10 g of metakaolin was added to the solution A, stirred and uniformly mixed to form a slurry B, the slurry B was added to a corn oil, wherein the slurry B accounts for 10% of a volume of the corn oil. The slurry B was stirred to disperse into balls, a stirring speed was 600 r/min, a stirring time was 0.5 hours, and a temperature of the corn oil is 55° C. A filtration was performed to obtain geopolymer microspheres I. The geopolymer microspheres I were washed, and then subjected to a high-temperature calcination at 850° C. for 2 hours to obtain the high-strength geopolymer hollow microspheres (M1). The microspheres have a particle size of 50-100 μm, a compressive strength of 23 MPa, a wall thickness of 10 μm, and a density of 0.60 g/cm$^3$.

Embodiment 2

High-Strength Geopolymer Hollow Microspheres, and a Preparation Method thereof.

2 g of sodium hydroxide (NaOH), 6 g of sodium silicate (Na$_2$SiO$_3$.9H$_2$O) and 4.5 g of sodium chloride (NaCl) were dissolved in 10 g of water to form a solution A, and 15 g of metakaolin was added to the solution A, stirred and uniformly mixed to form a slurry B, the slurry B was added to a soybean oil, wherein the slurry B accounts for 15% of a volume of the soybean oil. The slurry B was stirred to disperse into balls, a stirring speed was 400 r/min, a stirring time was 1.5 hours, and a temperature of the soybean oil is 65° C. A filtration was performed to obtain geopolymer microspheres I. The geopolymer microspheres I were washed, and then subjected to a high-temperature calcination at 1000° C. for 1.5 hours to obtain the high-strength geopolymer hollow microspheres (M2). The microspheres have a particle size of 250-300 μm, a compressive strength of 27 MPa, a wall thickness of 45 μm, and a density of 0.65 g/cm$^3$.

Embodiment 3

High-Strength Geopolymer Hollow Microspheres, and a Preparation Method thereof.

1.2 g of sodium hydroxide (NaOH), 4 g of sodium silicate (Na$_2$SiO$_3$.9H$_2$O) and 5 g of sodium chloride (NaCl) were dissolved in 10 g of water to form a solution A, and 12 g of metakaolin was added to the solution A, stirred and uniformly mixed to form a slurry B, the slurry B was added to a corn oil, wherein the slurry B accounts for 40% of a volume of the corn oil. The slurry B was stirred to disperse into balls, a stirring speed was 500 r/min, a stirring time was 2.0 hours, and a temperature of the corn oil is 75° C. A filtration was performed to obtain geopolymer microspheres I. The geopolymer microspheres I were washed, and then subjected to a high-temperature calcination at 1200° C. for 1 hour to obtain the high-strength geopolymer hollow microspheres (M3). The microspheres have a particle size of 250-300 μm, a compressive strength of 24 MPa, a wall thickness of 30 μm, and a density of 0.70 g/cm$^3$.

Embodiment 4

High-Strength Geopolymer Hollow Microspheres, and a Preparation Method thereof.

1.4 g of sodium hydroxide (NaOH), 6 g of sodium silicate (Na$_2$SiO$_3$.9H$_2$O) and 4 g of sodium chloride (NaCl) were dissolved in 10 g of water to form a solution A, and 12 g of metakaolin was added to the solution A, stirred and uniformly mixed to form a slurry B, the slurry B was added to a corn oil, wherein the slurry B accounts for 30% of a volume of the corn oil. The slurry B was stirred to disperse into balls, a stirring speed was 700 r/min, a stirring time was 0.5 hours, and a temperature of the corn oil is 85° C. A filtration was performed to obtain geopolymer microspheres I. The geopolymer microspheres I were washed, and then subjected to a high-temperature calcination at 900° C. for 2 hours to obtain the high-strength geopolymer hollow microspheres (M4). The microspheres have a particle size of 100-200 μm, a compressive strength of 26 MPa, a wall thickness of 25 μm, and a density of 0.65 g/cm$^3$.

Embodiment 5

High-Strength Geopolymer Hollow Microsphere, and a Preparation Method thereof.

Figure 2:
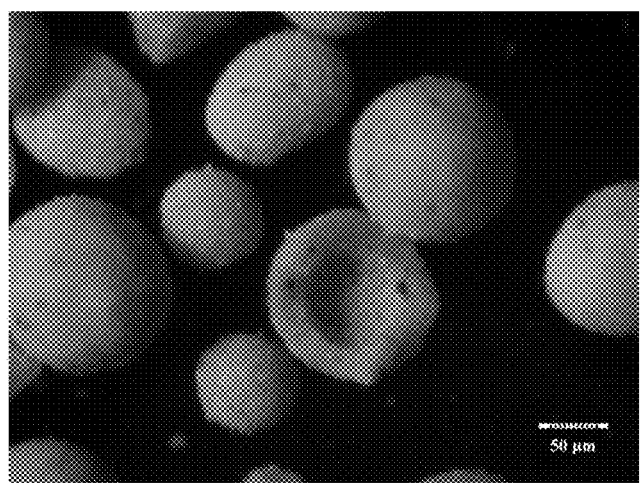
FIG. 2 is a broken microsphere showing that the microsphere is hollow (the microsphere and a cavity inside the microsphere can be clearly seen from the figure)

1.5 g of sodium hydroxide (NaOH), 5 g of sodium silicate (Na$_2$SiO$_3$.9H$_2$O) and 3 g of sodium chloride (NaCl) were dissolved in 10 g of water to form a solution A, and 10 g of metakaolin was added to the solution A, stirred and uniformly mixed to form a slurry B, the slurry B was added to a corn oil, wherein the slurry B accounts for 10% of a volume of the corn oil. The slurry B was stirred to disperse into balls, a stirring speed was 550 r/min, a stirring time was 2 hours, and a temperature of the corn oil is 60° C. A filtration was performed to obtain geopolymer microspheres I. The geopolymer microspheres I were washed, and then subjected to a high-temperature calcination at 900° C. for 2 hours to obtain the high-strength geopolymer hollow microspheres (M5). The microspheres have an average particle size of 200 μm, a wall thickness of 20-30 μm. The micrographs of the microspheres M5 are shown in FIG. 1 and FIG. 2.

Embodiment 6

A Method of Preparing Phase Change Energy Storage Microspheres.

The high-strength geopolymer hollow microspheres (M5) were used as carriers, phase change materials, i.e., paraffin (C18-30), were absorbed into hollows of the carrier microspheres by a vacuum suction. The geopolymer microspheres and the paraffin in a molten state were placed in an open container, the open container was placed in a vacuum chamber. Under a pressure of −0.1 MPa, a vacuumization was performed for 60 min, the microspheres were moved from the vacuum chamber to a 4° C. refrigerator for freezing until the paraffin become solid to obtain microspheres carrying the phase change materials (paraffin-geopolymer microspheres). A mass of the paraffin is 15% of that of the hollow microspheres. The paraffin-geopolymer microspheres were mixed with an ambient cured waterborne epoxy resin to make the epoxy resin coat on surfaces of the microspheres, a mass of the epoxy resin is 10% of that of the hollow microspheres. Subsequently, a calcium carbonate powder dispersant with a particle size of 1200 mesh was added, and a stirring was performed at 100 r/min for 0.5 hours to disperse the microspheres. After the epoxy resin was solidified, the superfluous powder dispersant was screened to obtain the phase energy storage microsphere sample 1.

Embodiment 7

A Method of Preparing Phase Change Energy Storage Microspheres.

The high-strength geopolymer hollow microspheres (M5) were used as carriers, phase change materials (C18-30) were absorbed into hollows of the carrier microspheres by a vacuum suction. The geopolymer hollow microspheres and the paraffin in a molten state were placed in an open container, the open container was placed in a vacuum chamber. Under a pressure of −0.1 MPa, a vacuumization was performed for 30 min, the microspheres were moved from the vacuum chamber to a 4° C. refrigerator for freezing until the paraffin become solid to obtain microspheres carrying the phase change materials (paraffin-geopolymer microspheres). A mass of the paraffin is 10% of that of the hollow microspheres. The paraffin-geopolymer microspheres were mixed with ambient cured oily epoxy resin to make the epoxy resin coat on surfaces of the microspheres, a mass of the epoxy resin is 8% of that of the hollow microspheres. Subsequently, a graphite powder dispersant with a particle size of 1500 mesh was added, and a stirring was performed at 150 r/min for 1 hour to disperse the microspheres. After the epoxy resin was solidified, the superfluous powder dispersant was screened to obtain the phase energy storage microsphere sample 2.

Embodiment 8

A Method of Preparing Phase Change Energy Storage Microspheres.

The high-strength geopolymer hollow microspheres (M5) were used as carriers, phase change materials (C18-30) were absorbed into hollows of the carrier microspheres by a vacuum suction. The geopolymer hollow microspheres and the paraffin in a molten state were placed in an open container, the open container was placed in a vacuum chamber. Under a pressure of −0.1 MPa, a vacuumization was performed for 40 min, the microspheres were moved from the vacuum chamber to a 4° C. refrigerator for freezing until the paraffin become solid to obtain microspheres carrying the phase change materials (paraffin-geopolymer microspheres). A mass of the paraffin is 12% of that of the hollow microspheres. The paraffin-geopolymer microspheres were mixed with an ambient cured waterborne epoxy resin to make the epoxy resin coat on surfaces of the microspheres, a mass of the epoxy resin is 12% of that of the hollow microspheres. Subsequently, a silicon powder dispersant with a particle size of 1500 mesh was added, and a stirring was performed at 150 r/min for 0.5 hours to disperse the microspheres. After the epoxy resin was solidified, the superfluous powder dispersant was screened to obtain the phase energy storage microsphere sample 3.

Embodiment 9

A Method of Preparing Phase Change Energy Storage Microspheres.

The high-strength geopolymer hollow microspheres (M5) were used as carriers, phase change materials (C18-30) were absorbed into hollows of the carrier microspheres by a vacuum suction. The geopolymer hollow microspheres and the paraffin in s molten state were placed in an open container, the open container was placed in a vacuum chamber. Under a pressure of −0.1 MPa, a vacuumization was performed for 80 min, the microspheres were moved from the vacuum chamber to a 4° C. refrigerator for freezing until the paraffin become solid to obtain microspheres carrying the phase change materials (paraffin-geopolymer microspheres). A mass of the paraffin is 18% of that of the hollow microspheres. The paraffin-geopolymer microspheres were mixed with an ambient cured oily epoxy resin to make the epoxy resin coat on surfaces of the microspheres, a mass of the epoxy resin is 15% of that of the hollow microspheres. Subsequently, an ultrafine slag powder dispersant with a particle size of 1500 mesh was added, and a stirring was performed at 300 r/min for 1.5 hours to disperse the microspheres. After the epoxy resin was solidified, the superfluous powder dispersant was screened to obtain the phase energy storage microsphere sample 4.

Figure 3:
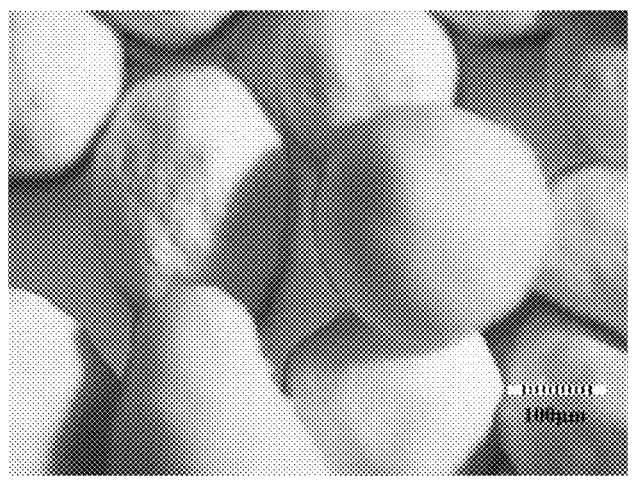
FIG. 3 is a micrograph showing a phase change energy storage microsphere dispersed by calcium carbonate powder.
Figure 4:
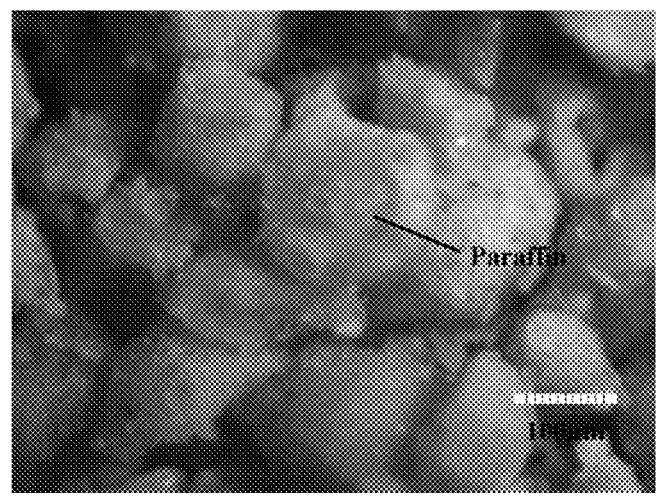
FIG. 4 is a micrograph showing paraffin absorbed into geopolymer hollow microspheres.

FIG. 3 is a micrograph showing the phase change energy storage microsphere sample 1. It can be seen that the surfaces of the microspheres are uniformly covered with the epoxy resin, and after dispersion by the calcium carbonate powder dispersant, the microspheres have good dispersion effect and no agglomeration phenomenon occurs. Broken microspheres in the phase change energy storage microsphere sample 1 were selected for a microscopic observation. As shown in FIG. 4, the paraffin was successfully absorbed into the geopolymer hollow microsphere.

Evaluations of effects of the above different phase change energy storage microsphere samples on a hydration exothermic temperature and a compressive strength of a cement slurry are shown in Table 1.

TABLE 1

Effects of phase change energy storage microsphere samples on cement slurry performance

| sample | hydration exothermic temperature peak/° C. | compressive strength after curing at 75° C. for 24 h/MPa |
|---|---|---|
| comparison sample: pure cement slurry | 103.7 | 28.5 |
| cement slurry + 5% (mass ratio) sample 1 | 83.3 | 27.2 |
| cement slurry + 10% (mass ratio) sample 2 | 71.5 | 23.8 |
| cement slurry + 5% (mass ratio) sample 3 | 80.5 | 26.8 |
| cement slurry + 10% (mass ratio) sample 4 | 74.6 | 25.4 |

The evaluation results show that an addition of phase change energy storage microspheres significantly reduces the cement hydration exothermic temperature peak, and has little effect on the compressive strength of cement stone.

Although the specific embodiments of the present invention have been described above in conjunction with the drawings, it is not intended to limit the scope of protection of the present invention. On the basis of the technical solutions of the present invention, various modifications or variations that can be made by those skilled in the art without any creative effort are still within the scope of protection of the present invention.

What is claimed is:

1. A method of preparing high-strength geopolymer hollow microspheres, comprising: dissolving sodium hydroxide (NaOH), sodium silicate ($Na_2SiO_3 \cdot 9H_2O$) and a spheroidizing aid in water to form a solution, adding active powder to the solution to obtain a first mixture, stirring and uniformly mixing the first mixture to form a slurry, adding the slurry to an oil phase dispersion medium to obtain a second mixture, stirring the second mixture to disperse the slurry into the oil phase dispersion medium to form balls, after the stirring, filtering the second mixture to obtain geopolymer microspheres, washing the geopolymer microspheres, and then carrying out a high-temperature calcination on the geopolymer microspheres to obtain the high-strength geopolymer hollow microspheres; wherein a mass percentage of the sodium hydroxide (NaOH), the sodium silicate ($Na_2SiO_3 \cdot 9H_2O$) and the spheroidizing aid is (10-40%): (20-60%): (20-60%), a mass ratio of the water to the active powder is 1:2-1, the slurry accounts for 5%-50% of a volume of the oil phase dispersion medium, a temperature of the high-temperature calcination is 800-1500° C., and a time of the high-temperature calcination is 1-8 hours.

2. The method of preparing the high-strength geopolymer hollow microspheres of claim 1, wherein the mass percentage of the sodium hydroxide (NaOH), the sodium silicate ($Na_2SiO_3 \cdot 9H_2O$) and the spheroidizing aid is (12-20%): (40-60%): (30-50%), the mass ratio of the water to the active powder is 1:1.5-1, and the slurry B accounts for 10%-40% of the volume of the oil phase dispersion medium.

3. The method of preparing the high-strength geopolymer hollow microspheres of claim 1, wherein the temperature of the high-temperature calcination is 850-1200° C., and the time of the high-temperature calcination is 1-2 hours.

4. The method of preparing the high-strength geopolymer hollow microspheres of claim 1, wherein the spheroidizing aid is a sodium salt and a potassium salt.

5. The method of preparing the high-strength geopolymer hollow microspheres of claim 4, wherein the sodium salt comprises one or more selected from the group consisting of sodium carbonate, sodium chloride, sodium nitrate, and sodium sulfate; and the potassium salt comprises one or more selected from the group consisting of potassium chloride, potassium carbonate, and potassium sulfate.

6. The method of preparing the high-strength geopolymer hollow microspheres of claim 1, wherein the active powder comprises one or more selected from the group consisting of fly ash, metakaolin and slag, and the active powder has a mesh number of 500-1000 mesh.

7. The method of preparing the high-strength geopolymer hollow microspheres of claim 1, wherein the oil phase dispersion medium is a corn oil, a soybean oil, a peanut oil, a kerosene, a castor oil, or a rapeseed oil.

8. The method of preparing the high-strength geopolymer hollow microspheres of claim 1, wherein a temperature of the oil phase dispersion medium is 50-90° C.

9. The method of preparing the high-strength geopolymer hollow microspheres of claim 1, wherein a stirring speed of dispersing the slurry into the oil phase dispersion medium is 400-1000 r/min, and a stirring time is 0.5-3 hours.

* * * * *